United States Patent
Sarshar et al.

(10) Patent No.: US 8,747,679 B2
(45) Date of Patent: Jun. 10, 2014

(54) SEPARATION SYSTEM AND METHOD FOR SEPARATING A FLUID MIXTURE WITH THIS SEPARATING SYSTEM

(71) Applicant: Caltec Limited, Bedfordshire (GB)

(72) Inventors: Mir Mahmood Sarshar, Buckinghamshire (GB); Mirza Najam Ali Beg, Buckinghamshire (GB); Carl Wordsworth, Bedford (GB)

(73) Assignee: Caltec Limited, Bedfordshire (GB)

( * ) Notice: Subject to any disclaimer, the term of this patent is extended or adjusted under 35 U.S.C. 154(b) by 0 days.

(21) Appl. No.: 13/959,097

(22) Filed: Aug. 5, 2013

(65) Prior Publication Data

US 2014/0027385 A1    Jan. 30, 2014

Related U.S. Application Data

(62) Division of application No. 12/863,703, filed as application No. PCT/GB2009/000016 on Jan. 5, 2009, now abandoned.

(30) Foreign Application Priority Data

Jan. 22, 2008 (GB) .................................. 0801045.6

(51) Int. Cl.
| | | |
|---|---|---|
| *B04C 7/00* | (2006.01) | |
| *B04C 3/06* | (2006.01) | |
| *B04C 5/28* | (2006.01) | |
| *B04C 11/00* | (2006.01) | |
| *B01D 17/038* | (2006.01) | |
| *C02F 1/38* | (2006.01) | |
| *B01D 17/02* | (2006.01) | |
| *B04C 3/00* | (2006.01) | |
| *C02F 101/32* | (2006.01) | |
| *C02F 103/36* | (2006.01) | |

(52) U.S. Cl.
CPC ... *B04C 7/00* (2013.01); *B04C 3/06* (2013.01); *B04C 5/28* (2013.01); *B04C 11/00* (2013.01); *B04C 2003/003* (2013.01); *B01D 17/0217* (2013.01); *B01D 2221/04* (2013.01); *C02F 1/38* (2013.01); *C02F 2101/32* (2013.01); *C02F 2103/365* (2013.01)
USPC ........ 210/788; 210/512.2; 210/790; 210/304; 210/143; 210/806; 209/12.1; 209/729; 209/725; 209/730; 55/459.1; 95/210; 95/212

(58) Field of Classification Search
CPC ............. B04C 3/00; B04C 3/04; B04C 3/06; B04C 5/00; B04C 5/02; B04C 5/04; B04C 5/08; B04C 5/081; B04C 5/12; B04C 5/13; B04C 5/14; B04C 5/24; B04C 5/26; B04C 5/28; B04C 5/30; B04C 7/00; B04C 2003/00; B04C 2003/006; B04C 2005/00; B04C 2005/12; B04C 2005/13; B04C 11/00; B04C 2003/003; C02F 1/38; C02F 2101/32; C02F 2103/365; B01D 17/02; B01D 17/0217; B01D 17/04; B01D 19/0094; B01D 19/0057; B01D 19/0052; B01D 21/26; B01D 45/12; B01D 53/24; B01D 2247/101; B01D 2221/04
USPC ........ 209/12.1, 719, 725, 729, 733, 734, 732, 209/715, 717, 722, 721, 720; 210/512.1, 210/512.2, 787–790, 294, 304, 806, 86, 210/143; 55/345, 349, 459.1; 95/259, 261, 95/271; 96/210, 212
See application file for complete search history.

(56) References Cited

U.S. PATENT DOCUMENTS

| | | | | | |
|---|---|---|---|---|---|
| 3,031,825 | A | * | 5/1962 | Fourniere .................... | 96/303 |
| 3,083,082 | A | * | 3/1963 | Kleiber ...................... | 422/147 |
| 3,247,651 | A | * | 4/1966 | Hutchings .................. | 55/345 |
| 3,261,467 | A | * | 7/1966 | Lennart ...................... | 209/728 |
| 3,330,097 | A | * | 7/1967 | Ammon ...................... | 96/212 |
| 3,352,745 | A | * | 11/1967 | Malm ......................... | 162/55 |
| 3,386,588 | A | * | 6/1968 | Ades ........................... | 210/512.2 |
| 3,764,008 | A | * | 10/1973 | Darley et al. ............... | 210/704 |
| 3,817,872 | A | * | 6/1974 | Evans et al. ................ | 502/21 |
| 3,990,992 | A | * | 11/1976 | McKinney .................. | 502/42 |
| 4,043,899 | A | * | 8/1977 | Anderson et al. ........... | 208/161 |
| 4,148,723 | A | * | 4/1979 | Mozley ....................... | 209/726 |

| | | | | |
|---|---|---|---|---|
| 4,414,112 A | | 11/1983 | Simpson et al. | |
| 4,446,107 A | * | 5/1984 | Buyan et al. | 422/107 |
| 4,673,495 A | * | 6/1987 | Carroll et al. | 210/232 |
| 4,711,720 A | * | 12/1987 | Young | 210/512.2 |
| 4,773,989 A | | 9/1988 | Pfalzer et al. | |
| 4,927,536 A | * | 5/1990 | Worrell et al. | 210/512.2 |
| 5,009,785 A | * | 4/1991 | Webb | 210/512.2 |
| 5,071,557 A | | 12/1991 | Schubert et al. | |
| 5,180,486 A | * | 1/1993 | Smolensky et al. | 210/195.1 |
| 5,336,410 A | * | 8/1994 | O'Brien et al. | 210/512.1 |
| 5,616,244 A | * | 4/1997 | Seureau et al. | 210/295 |
| 5,711,374 A | * | 1/1998 | Kjos | 166/265 |
| 5,770,050 A | | 6/1998 | Trefz et al. | |
| 5,961,841 A | | 10/1999 | Bowers | |
| 5,965,022 A | * | 10/1999 | Gould et al. | 210/512.2 |
| 6,082,452 A | * | 7/2000 | Shaw et al. | 166/105.5 |
| 6,132,494 A | | 10/2000 | Kjos et al. | |
| 6,269,880 B1 | | 8/2001 | Landry | |
| 6,344,064 B1 | * | 2/2002 | Conrad | 55/337 |
| 6,582,600 B1 | * | 6/2003 | Hashmi et al. | 210/512.2 |
| 6,918,494 B2 | * | 7/2005 | Girdler | 209/734 |
| 7,128,375 B2 | | 10/2006 | Watson | |
| 8,317,904 B2 | | 11/2012 | Sarshar et al. | |
| 2002/0011318 A1 | | 1/2002 | Jong | |
| 2003/0168391 A1 | * | 9/2003 | Tveiten | 210/188 |
| 2005/0115273 A1 | | 6/2005 | Bakker et al. | |
| 2006/0130443 A1 | * | 6/2006 | Dirkse et al. | 55/345 |
| 2007/0068127 A1 | * | 3/2007 | Noguchi | 55/459.1 |
| 2007/0187321 A1 | | 8/2007 | Bjornson et al. | |
| 2007/0209971 A1 | | 9/2007 | Duyvesteyn et al. | |
| 2007/0215541 A1 | * | 9/2007 | Kampfer | 210/512.2 |
| 2007/0262033 A1 | * | 11/2007 | Movafaghian et al. | 210/788 |

FOREIGN PATENT DOCUMENTS

| | | |
|---|---|---|
| EP | 0 313 197 B1 | 12/1995 |
| EP | 0 717 818 B1 | 5/1998 |
| EP | 1 180 400 A1 | 2/2002 |
| GB | 1 506 877 | 4/1978 |
| GB | 2 258 167 A | 2/1993 |
| GB | 2 263 077 A | 7/1993 |
| GB | 2 394 737 | 5/2004 |
| GB | 2 440 726 A | 2/2008 |
| WO | WO 92/04124 | 3/1992 |
| WO | WO 95/07414 | 3/1995 |
| WO | WO 97/07868 | 3/1997 |
| WO | WO 01/83075 A1 | 11/2001 |
| WO | WO 01/87453 A2 | 11/2001 |
| WO | WO 2004/026486 | 4/2004 |
| WO | WO 2005/094962 | 10/2005 |
| WO | WO 2007/001174 A1 | 1/2007 |

OTHER PUBLICATIONS

Notification of Co-Pending U.S. Appl. No. 13/003,842 No Date.
British Search Report dated May 19, 2008 for Application No. GB0801045.6.
International Search Report mailed Apr. 17, 2009 for International application No. PCT/GB2009/000016.
Written Opinion of the International Searching Authority mailed Apr. 17, 2009 for International application No. PCT/GB2009/000016.

* cited by examiner

*Primary Examiner* — David C Mellon
(74) *Attorney, Agent, or Firm* — Fay Sharpe LLP

(57) ABSTRACT

A separation system for separating a fluid mixture includes a uniaxial cyclonic separator (2) having a first inlet (16) for receiving a fluid mixture, a separation chamber (18) for separating the fluid mixture by cyclonic action into a dense first fluid and a less dense second fluid, a first outlet (22) for the first fluid and a second outlet (26) for the second fluid. The system further includes a reverse flow cyclonic separator (32) having a second inlet (30) for receiving the first fluid from the first outlet (22), a separation chamber for separating the first fluid by cyclonic action into a dense third fluid and a less dense fourth fluid, a third outlet (34) for the third fluid and a fourth outlet (36) for the fourth fluid. A method for the bulk separation of water from an oil/water mixture is also provided.

20 Claims, 5 Drawing Sheets

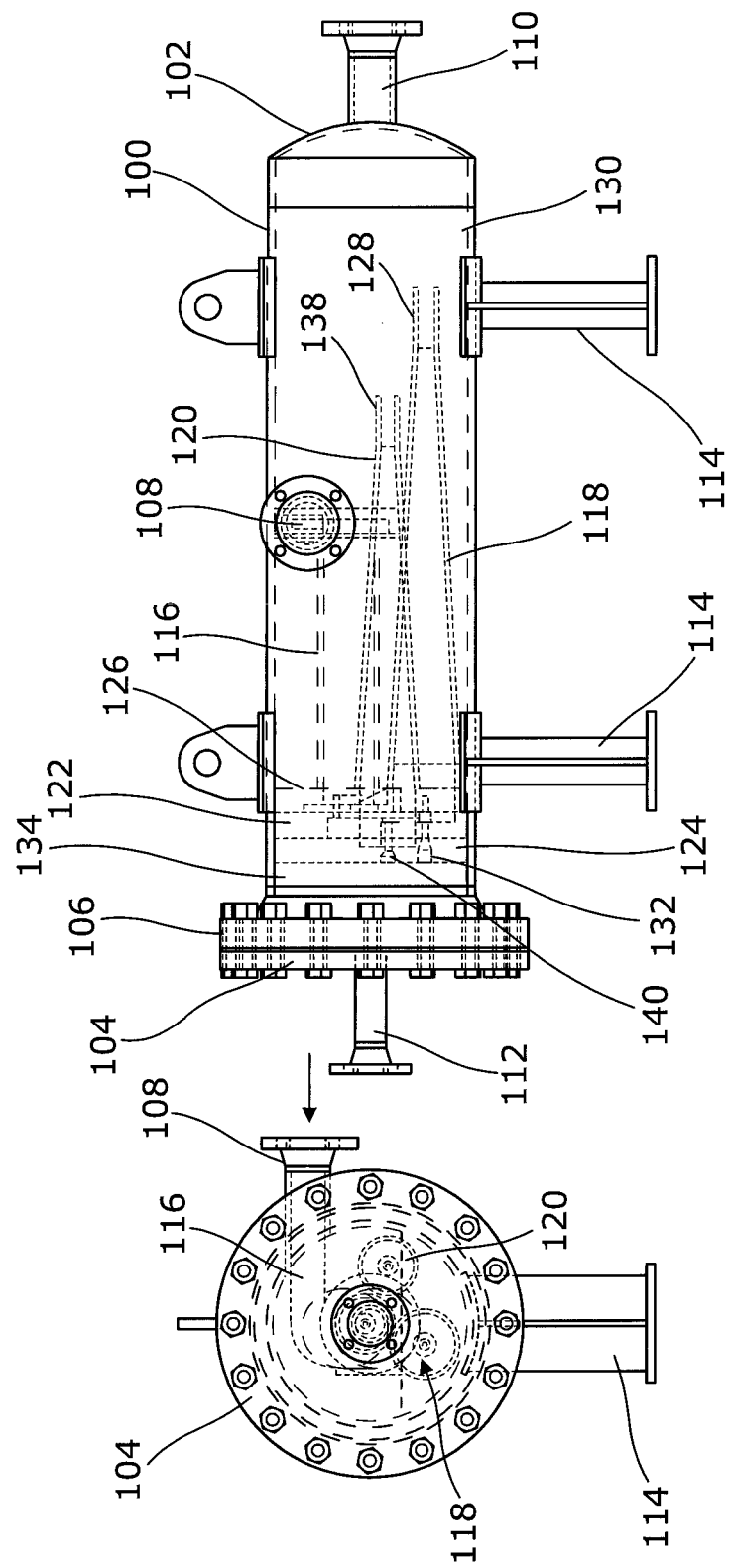

SEPARATION SYSTEM AND METHOD FOR SEPARATING A FLUID MIXTURE WITH THIS SEPARATING SYSTEM

This application is a divisional of U.S. application Ser. No. 12/863,703 filed Oct. 15, 2010, now abandoned, which is the U.S. National Phase of PCT international application No. PCT/GB2009/000016 filed Jan. 5, 2009, which claims priority from United Kingdom application No. GB-0801045.6 filed Jan. 22, 2008. The entire disclosure of U.S. application Ser. No. 12/863,703 filed Oct. 15, 2010 is hereby expressly incorporated by reference into the present specification.

This invention relates to a separation system for separating a fluid mixture, and a method of separating a fluid mixture. In particular, but not exclusively, it relates to a system for bulk separation of water from an oil-water mixture and a method thereof.

The produced oil from oil fields often contains some water. The amount of water produced can vary from close to nil to an extremely high value, for example close to 99% of the total produced fluids. The amount of water produced is usually presented as a percentage of the total liquid phase and is referred to as the "water cut".

Separation of oil and water is traditionally carried out in several stages. The first stage usually involves using conventional gravity separators. Gravity separators rely purely on gravity (one "g" force) to separate oil from water. A residence time varying from a few minutes to thirty minutes or more is often needed to achieve the first stage of water separation. The need for such a long residence time results in the separators being very bulky with a very large fluid inventory. A more compact separator that can achieve the same level of separation would provide many advantages, particularly on offshore platforms where space and weight are at a premium.

Experiments in separation have shown that cyclonic separators, which can generate a g-force of from several to hundreds of times "g", could speed up separation and eliminate the need for a long residence time and bulky separator units.

Hydrocyclones are well known reverse-flow cyclonic separators with a steep conical shape, which are sometimes used for de-oiling water. Examples are described in GB2263077A and GB1506877. They are referred to as reverse-flow cyclones as the separated phases move in opposite directions to outlets at opposite ends of the separator. Tests with hydrocyclones have shown that they cannot efficiently separate oil from water when the oil concentration is too high (for example, above 1%). Performance is therefore poor if the water cut is in the range of 50% to 99% and even worse if the water cut is below 50% or the oil is the continuous phase. Hydrocyclones also cause a big pressure loss, often exceeding 3 bar or more, which may be undesirable in an oil production installation. Hydrocyclones can however provide good separation when the oil content of the oil-water mixture is below 1%, and excellent separation when the oil content is very low (below about 1000 to 2000 parts per million (ppm)).

Another type of cyclonic separator is the uniaxial cyclonic separator, in which the fluids flow in the same direction from an inlet at one end of the device to separate outlet chambers at the opposite end of the device. Examples are described in European patent applications EP0313197A and EP0717818A. However, tests using a uniaxial cyclonic separator have shown that this device can only partially separate oil from water, with the separated water still containing a significant quantity of oil. The oil content varies depending on the type and the viscosity of oil but may reach 2% to 5% of the mixture. This is too high to allow it to be discharged without further treatment.

There is therefore a need for a system that can separate an oil-water mixture and deliver all or part of the separated water with a very low oil content. Preferably, the system is capable of removing approximately 40-70% of the water from the oil-water mixture, where the removed water has an oil content of 2,000 to 5,000 ppm or less.

According to the present invention there is provided a separation system for separating a fluid mixture, the system including a uniaxial cyclonic separator having a first inlet for receiving a fluid mixture, a separation chamber for separating the fluid mixture by cyclonic action into a first fluid and a second fluid, the first fluid being denser than the second fluid, a first outlet for the first fluid and a second outlet for the second fluid, and a reverse flow cyclonic separator having a second inlet for receiving the first fluid from the first outlet, a separation chamber for separating the first fluid by cyclonic action into a third fluid and a fourth fluid, the third fluid being denser than the fourth fluid, a third outlet for the third fluid and a fourth outlet for the fourth fluid.

We have found that by combining a uniaxial separator with a reverse flow separator in a two-stage separation system we can remove a substantial portion of the denser fluid from the less dense fluid, where the removed fluid consists almost entirely of the denser fluid. For example, when separating water from a 50:50 oil-water mixture, we can remove 40-70% of the water, where the removed water has an oil content of 5000 ppm or less, and often 2000-1000 ppm. This significantly reduces the load on downstream separators and process equipment and allows the separated oil-rich fluid to be transported, stored and processed far more efficiently. The removed water already has a very low oil content and can therefore be discarded either immediately if it is sufficiently clean, or after a further gravitational or cyclonic separation if required to reduce the oil content to 25-40 ppm for disposal to sea.

Neither a uniaxial separator nor a reverse-flow separator can achieve a similar degree of separation when operating alone. Uniaxial separators can process fluids with a high oil content, but the separated water still has an oil content that is too high for disposal. Reverse-flow separators on the other hand can provide a very high degree of separation, but cannot operate efficiently if the oil content of the fluid entering the separator is too high. The system according to the present invention overcomes these problems by providing a system in which a uniaxial separator separates the fluid mixture into a first fluid and a second fluid in a first separation stage, and a reverse flow separator separates the first fluid into a third fluid and a fourth fluid in a second separation stage.

Advantageously, the separation system includes a second reverse flow cyclonic separator having a third inlet for receiving the second fluid from the second outlet, a separation chamber for separating the second fluid by cyclonic action into a fifth fluid and a sixth fluid, the fifth fluid being denser than the sixth fluid, a fifth outlet for the fifth fluid and a sixth outlet for the sixth fluid. The second reverse flow cyclonic separator balances the output pressures at the first and second outlets of the uniaxial cyclonic separator, enabling the system to compensates automatically for variations in the flow rate and/or composition of the incoming fluid mixture. It also serves to separate the second fluid into a fifth fluid and a sixth fluid, where the fifth fluid is denser than the sixth fluid. If the fifth fluid is sufficiently clean, it can be discarded or sent for further treatment with the third fluid.

The fourth outlet and the sixth outlet may be connected to combine the fourth and sixth fluids (i.e. the oil-rich fluids). The fifth outlet may be connected to the third outlet to combine the fifth and third fluids (i.e. the water-rich fluids). Alternatively, the fifth outlet may be connected to the sixth outlet to combine the fifth and sixth fluids. Preferably, the fifth outlet is connected via flow control means, for example isolation valves, to the third outlet and the sixth outlet to combine the fifth fluid selectably with either the third fluid or the sixth fluid.

The separation system may include a flow control device, for example a tuning valve, for controlling the flow through the third outlet. The system may include a sensor for sensing the composition of the third fluid and a control device for controlling operation of the flow control device according to the sensed composition of the third fluid. This allows the system to adjust the flow rate through the first reverse flow separator, so as to achieve a required degree of separation of the third and fourth fluids.

Preferably, the separation system includes a containment vessel for the uniaxial cyclonic separator and the reverse flow cyclonic separators, the containment vessel having an upper chamber connected to the fourth and sixth outlets to receive the fourth and sixth fluids, and a first lower chamber connected to the third outlet to receive the third fluid. This allows an integrated system to be provided, which is easy to install and connect.

The first lower chamber may be connected to the fifth outlet to receive the fifth fluid. The separation system may include a second lower chamber connected to the fifth outlet to receive the fifth fluid. The second lower chamber may also be connected to the upper chamber to receive the fourth and sixth fluids.

The containment vessel preferably includes a chamber containing oil-rich flow from multiple uniaxial cyclonic separators and a chamber containing water-rich flow from multiple reverse flow cyclonic separators. The chambers allow isolation of the separated oil-rich and water-rich fluids, and also allow oil-rich or water-rich fluids from the outlets of the reverse flow cyclones to be combined. By varying the number of separators within the vessel, the capacity of the vessel can be increased or decreased as required.

The separation system may include a flow conditioning device upstream of the uniaxial cyclonic separator, having an inlet for a precursor fluid, a separation chamber for separating the precursor fluid by gravity into a denser fluid and a less dense fluid, an outlet for the denser fluid and an outlet for the less dense fluid, wherein the outlet for the denser fluid is connected to the first inlet of the uniaxial cyclonic separator. This allows a preliminary degree of separation to be provided, so reducing the load on the downstream system and is ideal when the aim is to separate only part of the produced water in order to avoid a bottle-neck or reduce the load on the gravity separators.

Advantageously, the flow conditioning device includes a substantially horizontal separation chamber having an inlet for a precursor fluid at one end, an outlet for the less dense fluid in an opposite end, and an outlet for the denser fluid in a lower part of the separation chamber. The separation chamber preferably contains at least one substantially vertical baffle plate to streamline the flow.

The separation system may include a gas separator device upstream of the uniaxial cyclonic separator, which is constructed and arranged to remove gas at least partially from the liquids fed to the first inlet of the uniaxial cyclonic separator. This allows more efficient operation of the downstream cyclonic separators.

The uniaxial cyclonic separator preferably includes a spiral-shaped inlet chamber, an elongate separation chamber and at least one spiral-shaped outlet chamber. Advantageously, the elongate separation chamber has a length in the range five to ten times its minimum diameter.

The reverse flow cyclonic separator is preferably substantially conical in shape, having a length in the range ten to twenty times its maximum diameter.

According to another aspect of the invention there is provided a separation system according to any one of the preceding statements of invention, for separating water from an oil/water mixture.

The oil/water mixture received at the first inlet of the uniaxial cyclonic separator may comprise at least 1% oil, or at least 5% oil, or at least 10% oil, up to approximately 45% oil, by volume. Advantageously, the third fluid comprises less than 1% oil, preferably less than 0.5% oil, more preferably less than 0.1% oil, by volume. The third fluid preferably comprises by volume 40-70% of the fluid mixture received at the first inlet.

According to another aspect of the invention there is provided a method of separating a fluid mixture, the method including delivering the fluid mixture to a uniaxial cyclonic separator and separating the fluid mixture by cyclonic action into a first fluid and a second fluid, the first fluid being denser than the second fluid, delivering the first fluid to a reverse flow cyclonic separator, and separating the first fluid by cyclonic action into a third fluid and a fourth fluid, the third fluid being denser than the fourth fluid.

Advantageously, the method includes delivering the second fluid from the uniaxial cyclone to a second reverse flow cyclonic separator and separating the second fluid by cyclonic action into a fifth fluid and a sixth fluid, the fifth fluid being denser than the sixth fluid.

The method may include combining the fourth and sixth fluids. The method may include combining the fifth and third fluids. The method may include combining the fifth and sixth fluids.

The method may include sensing the composition of the third fluid and controlling the flow of the third fluid according to the sensed composition of the third fluid.

The method may include separating a precursor fluid by gravity into a denser fluid and a less dense fluid, and delivering the denser fluid to the uniaxial cyclonic separator.

Advantageously, the method includes removing gas at least partially from the fluids fed to the uniaxial cyclonic separator.

According to another aspect of the invention there is provided a method according to any one of the preceding statements of invention, for separating water at least partially from an oil/water mixture.

The oil/water mixture received at the inlet of the uniaxial cyclonic separator may comprise at least 1% oil, or at least 5% oil, or at least 10% oil, up to approximately 45% oil, by volume.

The third fluid may comprise less than 1% oil, preferably less than 0.5% oil, more preferably less than 0.1% oil, by volume. The third fluid may comprise by volume 40-70% of the fluid mixture received at the first inlet.

After separating part of the produced water, the remainder of oil and water can be sent to a gravity separator for further separation. The performance of the gravity separator will then be improved as its total load is reduced and it is no longer overloaded. The size of the gravity separator can thus be reduced significantly.

Certain embodiments of the invention will now be described by way of example, with reference to the accompanying drawings, in which:

FIG. 2 is an end view and FIG. 3 is a side view of an integrated separator unit;

Figure 1:
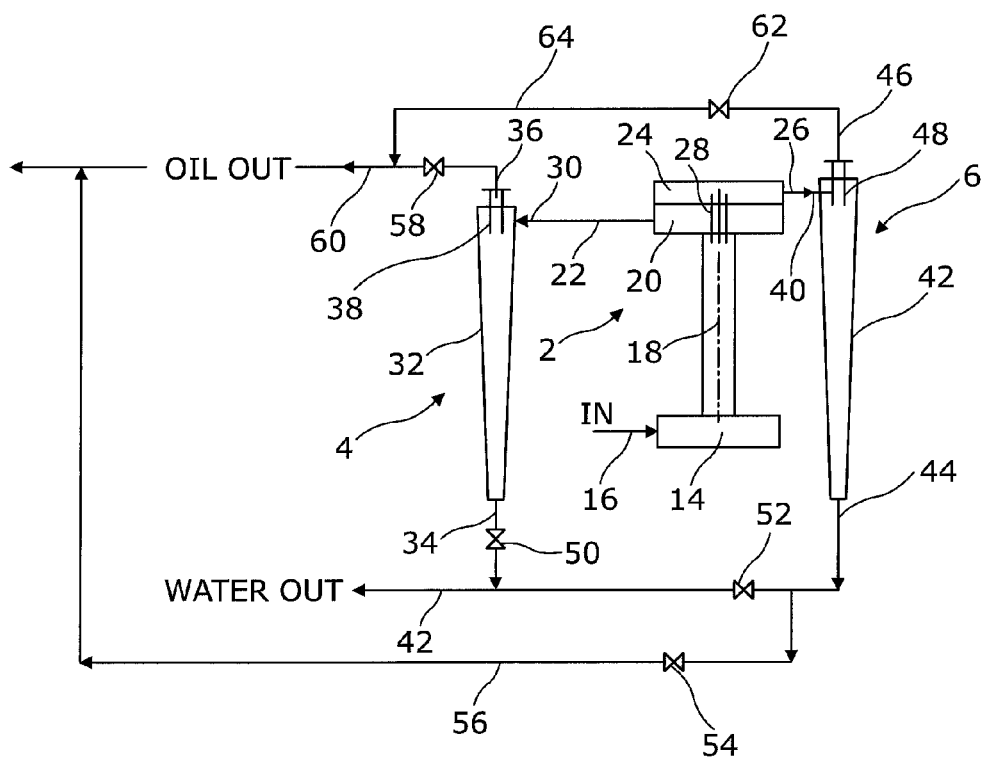
FIG. 1 is a schematic view of a first separation system for removing bulk water from an oil water mixture.

FIG. 1 shows a system for removing bulk water from an oil/water mixture, for example the produced fluids of an oil well. The system includes a uniaxial cyclonic separator 2, a first reverse flow cyclonic separator 4 and a second reverse flow cyclonic separator 6.

The uniaxial cyclone separator 2 includes an inlet chamber 14 having a first inlet 16 for receiving the oil/water mixture, a separation chamber 18 for separating the oil/water mixture into a first fluid and a second fluid, a first outlet chamber 20 with a first outlet 22 for the first fluid, and a second outlet chamber 24 with a second outlet 26 for the second fluid. The first fluid is denser than the second fluid, having a higher proportion of water to oil.

The uniaxial cyclone separator 2 is substantially conventional and may for example be similar to the separator described in GB 0616101.2, the content of which is incorporated by reference herein. However, the dimensions and relative dimensions of individual parts may be different from the separator in described in GB 0616101.2. The inlet chamber 14 and the outlet chambers 20,24 are involute in shape, the inlet 16 and the first and second outlets 22,26 being substantially tangential to the respective chamber. The separation chamber 18 is elongate, having a length that is generally in the range five to ten times its internal diameter. The chamber may be of substantially uniform cross-section, or it may contain a narrow throat portion similar to that of the uniaxial cyclonic separator described in GB 0616101.2.

The fluids entering the uniaxial cyclonic separator 2 through the first inlet 16 are caused to swirl around the axis of the separation chamber 18 by the involute shape of the inlet chamber 14. This swirling motion generates a high "g" force, which causes the first and second fluids to separate by cyclonic action. The first fluid, being denser, moves radially outwards and flows into the first outlet chamber, to exit through the first outlet 22. The second fluid, being less dense, is forced radially inwards and flows through a vortex finder tube 28 into the second outlet chamber 24, from which it exits through the second outlet 26. The involute shapes of the first and second outlet chambers restore the pressure of the first and second fluids, so that the pressure drop across the cyclonic separator 2 is minimal.

The first reverse flow cyclonic separator 4 comprises a hydrocyclone having a second inlet 30, a separation chamber 32, a third outlet 34 and a fourth outlet 36. The inlet 30 is located at the upper end of the separation chamber 32 and is connected to the first outlet 22 to receive the first fluid from the uniaxial cyclonic separator 2. The separation chamber 32 has a narrow conical shape, the third outlet 34 being located at the lower and narrower end of the chamber, while the fourth outlet 36 comprises an axial vortex finder tube 38 that is located at the upper, wider end of the chamber 32. The length of the separation chamber is preferably in the range ten to twenty times its maximum internal diameter.

In use, the first fluid (the denser, water-rich fluid) flows from the first outlet 22 through the second inlet 30 into the upper end of the separation chamber 32. The second inlet 30 is arranged tangentially relative to the chamber, which causes the first fluid to swirl around the longitudinal axis of the chamber 32. This subjects the fluid to a high "g" force, which causes cyclonic separation of the first fluid into a third fluid and a fourth fluid, where the density of the third fluid is greater than that of the fourth fluid.

The third fluid moves radially outwards towards the circumferential wall of the separation chamber 32 and gradually flows downwards to the third outlet 34 at the lower end of the chamber. The fourth fluid, being less dense, is forced radially inwards and exits the chamber 32 through the axial vortex finder tube 38 and the fourth outlet 36 at the upper end of the chamber 32.

The third fluid, being denser than the fourth fluid, has a high water content and a very low oil content, typically in the range 0.2-0.5% (2000-5000 ppm) or less. This fluid may still need one or two further stages of treatment before it is suitable for sea disposal, in order to achieve an acceptable oil content, for example in the range 40-20 ppm. This last stage of separation can be achieved with conventional separation techniques, for example using hydrocyclones and/or corrugated plate interceptors (which do not form part of this patent application). The third fluid, being less dense, has a higher oil content and may be sent to a conventional gravity separator for further treatment.

The second reverse flow cyclonic separator 6 also comprises a hydrocyclone which is similar to the first reverse flow cyclonic separator 4 and comprises a third inlet 40, a separation chamber 42, a fifth outlet 44 and a sixth outlet 46. The third inlet 40 is located at the upper end of the separation chamber 42 and is connected to the second outlet 26 to receive the second fluid from the uniaxial cyclonic separator 2.

The separation chamber 42 has a narrow conical shape, the fifth outlet 44 being located at the lower, narrower end of the chamber, while the sixth outlet 46 comprises an axial vortex finder tuber 48 that is located at the upper, wider end of the chamber 42.

In use, the second fluid (comprising the less dense, oil rich fluid) flows from the second outlet 26 of the uniaxial separator 2 through the third inlet 40 into the upper end of the separation chamber 42. The third inlet 40 is arranged tangentially relative to the chamber 42, which causes the second fluid to swirl around the longitudinal axis of the chamber. This causes cyclonic separation of the second fluid into a fifth fluid and a sixth fluid, where the density of the fifth fluid is greater than that of the sixth fluid. The fifth fluid therefore moves radially outwards towards the circumferential wall of the separation chamber and gradually flows downwards to the fifth outlet at the lower end of the chamber. The sixth fluid, being less dense, is forced radially inwards and then exits the chamber 42 through the axial vortex finder tube 48 at the upper end of the chamber 42.

The fifth fluid, being denser than the sixth fluid, has a higher water content and a lower oil content than the fifth fluid.

The third fluid has the highest water content and the lowest oil content. Typically, for example, the third fluid will have an oil content in the range 0.2% to 0.5%, or lower. The fifth fluid will also have a low oil content, although in some cases this may not be as low as the third fluid. The fourth fluid and the sixth fluid both have a high oil content, the sixth fluid having the highest oil content.

The third outlet 34 is connected via a first flow control valve (or "tuning valve") 50 to a seventh outlet line 42 for water with a very low oil content. This valve may be used for tuning the system by throttling the flow of fluid through the outlet 34 to increase the degree of separation achieved by the first reverse flow separator 4 and reduce the quantity of oil contained with the water flowing through the seventh outlet line 42.

The fifth outlet 44 is connected either via a first isolation valve 52 to the seventh outlet line 42, or via a second isolation valve 54 to an eighth outlet line 56 for water with a higher oil content, if its oil content is too high or dissimilar to the dense phase from the third outlet 34 to mix with the fluids from that outlet 34.

By operating the first and second isolation valves 52,54 it is possible to control whether the fifth fluid flows from the fifth outlet 44 into either the seventh outlet line 42 or the eighth outlet line 56. This will depend on whether the oil content of the fifth fluid is sufficiently low to allow it to be combined with the third fluid.

The fourth outlet 36 is connected via a second flow control valve 58 to a ninth outlet line 60 for fluid with a high oil content. The sixth outlet 46 is also connected via a third flow control valve 62 and a tenth outlet line 64 to the ninth outlet line 60. The fourth fluid and the sixth fluid are therefore combined in the ninth outlet line 60. The eighth outlet line 56 is also connected to the ninth outlet line 60. Therefore, when the second isolation valve 54 is open, the fifth fluid flowing through the fifth outlet 44 is also combined with the fourth fluid and the sixth fluid in the ninth outlet line 60.

In use, the uniaxial cyclonic separator 2 provides a first separation stage, separating the oil/water mixture flowing through the first inlet 16 into a water-rich first fluid and an oil-rich second fluid.

The water-rich first fluid is then further separated by the first reverse flow separator 4 to provide a third fluid comprising water with a very low oil content, and a fourth fluid with a higher oil content.

The oil-rich second fluid also undergoes a secondary separation stage to provide a fifth fluid with a low oil content and a sixth fluid with a very high oil content. The oil rich fourth and sixth fluids are combined in the ninth outlet line and sent for further processing, while the third fluid comprising water with a very low oil content is either discharged directly if the oil content is sufficiently low, or is sent for further cleaning for example in a conventional gravity separator before being discharged.

The fifth fluid may be combined either with the third fluid if the oil content of the fluid is sufficiently low, or with the fourth and sixth fluids and sent for further processing. In this way, the system removes a large portion (typically 40-70%) of the water in the oil/water mixture, thereby allowing the total volume of the oil-rich fluid sent for further processing to be substantially reduced.

The second reverse flow separator 6 has two functions: the first being to further separate the oil-rich fluids leaving through the second outlet 26 of the uniaxial separator 2, while the second is to balance the pressures automatically in the first and second outlets 22,26 of the uniaxial separator at varying flow rates. An imbalance of pressures in the outlets will cause poor performance and excessive diversion of the fluid into the outlet line that offers less resistance (i.e. a lower back pressure). Because the first and second reverse flow separators are of a similar design, they provide a passive flow control that ensures balances flow even under varying flow rates and regimes.

Alternatively, the second reverse flow separator 6 may be omitted, in which case the second fluid flowing through the second outlet 26 will be delivered directly via the third flow control valve 62 and the tenth outlet line 64 into the ninth outlet line 60, where it will be combined with the fourth fluid. In this case, the fifth outlet 44, the second and third flow control valves 52,54 and the eighth outlet line 56 will be omitted. However, it is preferable to include the second reverse flow separator, as this automatically balances the flow of fluids through the first and second outlets of the uniaxial cyclone separator 2 and so compensates for fluctuations in the flow rate and composition of the oil/water mixture flowing through the first inlet 16.

Preferably, the system includes a sensor (not shown) for sensing the composition of the third fluid flowing through the third outlet 34, and a control device for controlling operation of the first flow control valve 50 according to the sensed composition of the third fluid. This allows the valve 50 to be opened or closed incrementally, so as to control the degree of separation provided by the system. In this way, the oil content of the third fluid can be controlled, so that it is maintained within predetermined limits.

The system may also include a sensor (not shown) for sensing the composition of the fifth fluid flowing through the fifth outlet 44 and controlling operation of the second and third flow control valves 52,54 according to the sensed composition of the fifth fluid. This control system can determine whether the fifth fluid is combined with the third fluid or with the fourth and sixth fluids, depending on the oil content of the fifth fluid.

FIGS. 2 and 3 show an embodiment of the invention in which the components of the separation system are provided in an integrated separator unit. The separator unit includes an elongate tubular housing 100 having an end wall 102 at one end and a removable cap 104 at the other end, which is bolted to a flange 106. An off-centre inlet 108 for an oil/water mixture extends through the side wall of the housing 100, an outlet 110 for water-rich fluid extends axially through the end wall 102 and an outlet 112 for oil-rich fluid extends axially in the opposite direction through the end cap 104. The housing 100 is supported horizontally by a pair of legs 114.

Within the housing 100 there is provided a uniaxial cyclonic separator 116, a first reverse flow cyclonic separator 118 and a second reverse flow cyclonic separator 120. The three cyclonic separators are essentially similar to those of the separator system described above and shown in FIG. 1.

The inlet chamber of the uniaxial cyclonic separator 116 is connected to the inlet 108 so as to receive the oil/water mixture. The inlet chamber delivers this mixture into the separation chamber of the uniaxial cyclonic separator, which separates the mixture into a first fluid and a second fluid, the first fluid being denser than the second fluid. The first fluid is therefore water-rich whereas the second fluid is comparatively oil-rich.

The first fluid is delivered via a first outlet chamber into a first transfer chamber 122 and the second fluid is delivered via the second outlet chamber into a second transfer chamber 124. The first and second transfer chambers are defined by bulkhead walls 126 that extend across the interior of the housing 100 towards the flanged end thereof.

The first reverse flow cyclone separator (or hydrocyclone) 118 is supported by the bulkhead walls 126 and is connected to the first transfer chamber 122 to receive at its inlet the water-rich first fluid. The first hydrocyclone 118 is conical in shape and extends parallel to the longitudinal axis of the housing 100, the narrower end 128 of the separator opening into an outlet chamber 130 for water-rich fluids towards the end wall 102. At its opposite end, the first reverse flow cyclonic separator 118 has an axial outlet 132 for low density, oil-rich fluids. This axial outlet 132 delivers the fluids into a second outlet chamber 134 at the flange end of the housing 100.

The second reverse flow cyclonic separator (or hydrocyclone) 120 is also supported by the bulkhead walls 126 and is connected to the second transfer chamber 124 to receive at its inlet the oil-rich second fluid. The separator 120 is conical in shape and extends parallel to the longitudinal axis of the housing 100, the narrower end 138 of the chamber opening into the first outlet chamber 130. At its opposite end, the second reverse flow separator 120 has an axial outlet 140, which also opens into the second outlet chamber 134 at the flange end of the housing 100.

The first outlet chamber 130 delivers water-rich fluids into the first outlet 110, and the second outlet chamber 134 delivers oil-rich fluids into the second outlet 112.

In use, a mixture of oil and water is delivered through the inlet 108 into the inlet chamber of the uniaxial cyclonic separator 116. This separates the oil and water mixture by cyclonic action into a first fluid, which is delivered to the inlet of the first reverse flow cyclonic separator 118, and a second fluid that is delivered into the inlet of the second reverse flow cyclonic separator 120. The reverse flow cyclonic separators 118,120 then further separate the first and second fluids so that the water-rich, high density fluids flow into the outlet chamber 130 at one end of the separator, whereas the low density, oil-rich fluids flow into the second outlet chamber 134 at the opposite end of the housing. The separated fluids then exit the integrated separator unit through the first and second outlets, 110,112.

The outlet pressure of each cyclonic separator unit may be controlled passively according to the design of the units, or alternatively tuning valves may be provided, as in the first system shown in FIG. 1, to optimise the performance of the unit. These valves may be operated manually or they may be servo-actuated valves that can be operated remotely and/or automatically to provide predetermined back-pressures on the outlet lines of the separator units, as determined by pressure transducers on the outlet lines.

The integrated separation unit provides a number of advantages, including the following:
 ease of installation on site or offshore, as all assembly work can be carried out in advance,
 the internal components including the uniaxial and reverse flow separators do not have to be designed to contain the full pressure rating of the production system, as the pressure is contained by the external housing. Each internal unit therefore only has to be designed to contain the relatively small pressure difference between its inlet and outlet, which is generally no more than about 1-2 bar (100–200 kPa),
 the uniaxial and reverse flow separators can be of a single standard size, the number of such units selected for each unit being determined according to the flow rate capacity specified for that unit.

Figure 4:
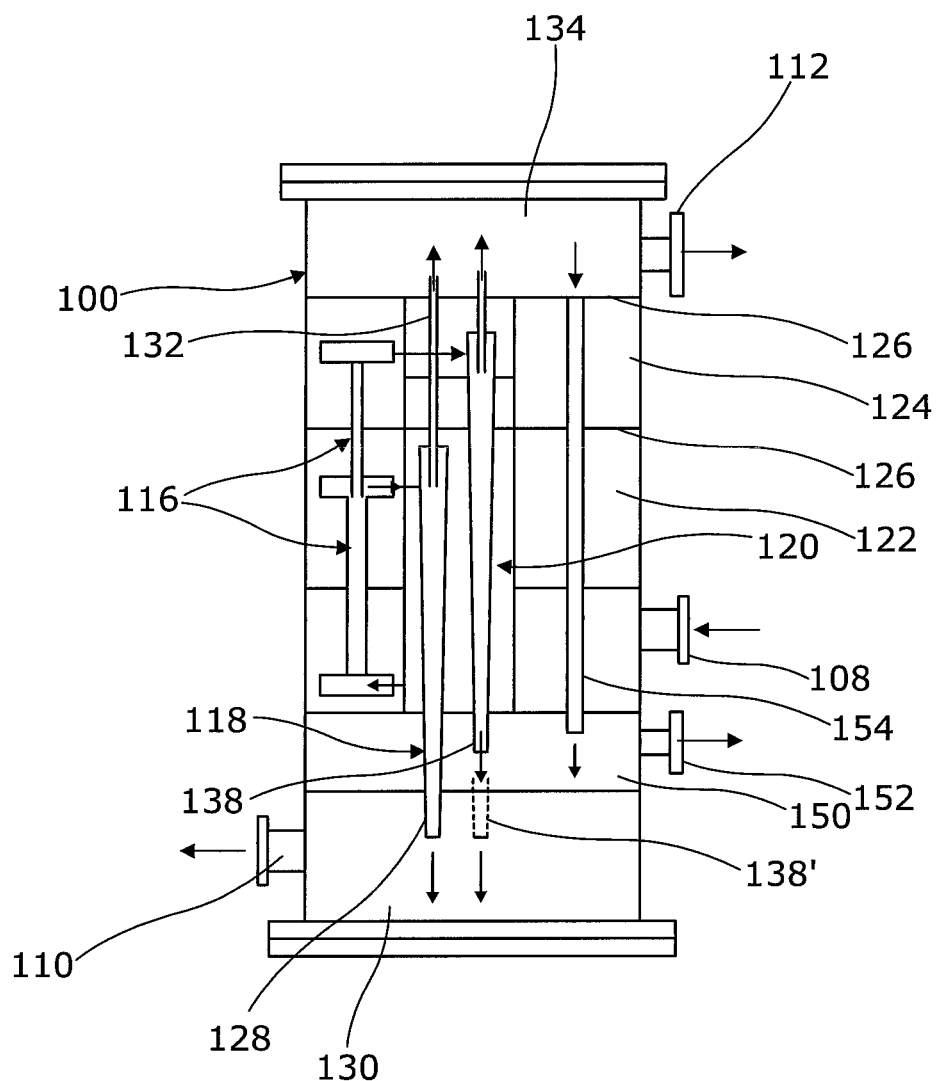
FIG. 4 is a side of a second integrated separator unit.

FIG. 4 shows a second integrated separator unit, which is similar in many ways to the first integrated separator unit described above and shown in FIGS. 2 and 3. The integrated separator is mounted vertically and the inlets and outlets all extend approximately radially from the housing 100. The housing 100 encloses a uniaxial cyclonic separator 116, a first reverse flow cyclonic separator 118 and a second reverse flow cyclonic separator 120.

A mixture of oil and water is delivered through an inlet 108 into the inlet chamber of the uniaxial cyclonic separator 116, which separates the mixture into a dense, water-rich first fluid and a less dense, oil-rich second fluid. The first fluid is transferred via a first transfer chamber 122 into the inlet of the first reverse flow cyclonic separator 118, which further separates the fluid into a third, water-rich fluid and a fourth, oil-rich fluid. The third fluid is delivered through the narrower, lower end 128 of the separator 118 into a first outlet chamber 130 at the lower end of the housing 100, from which it exits through an outlet 110. The fourth, oil-rich fluid is delivered through an axial outlet 132 at the upper end of the separator 118 into a second outlet chamber 134, from which it exits through an outlet 112.

The second oil-rich fluid is delivered from the uniaxial separator 116 via a second transfer chamber 124 into the inlet of the second reverse flow separator 120, which further separates the fluid into a fifth water-rich fluid and a sixth oil-rich fluid. The fifth fluid is delivered through the narrower, lower end 138 of the separator into a third outlet chamber 150 and from there into a third outlet 152. The sixth oil-rich fluid is delivered through the axial outlet 140 at the upper end of the separator into the second outlet chamber 134, and from there into the outlet 112.

Operation of the unit is similar to operation of the first integrated separator unit described above, except that the fifth fluid is kept separate from the third fluid and exits the unit through the third outlet 152. This arrangement is therefore preferable if the fifth fluid contains significantly more oil than the third fluid, and therefore requires further treatment before it can be discarded. However, if the fifth fluid is sufficiently free of oil to allow it to be combined with the third fluid, the lower end 138—may be extended into the first outlet chamber 130, as shown in broken lines.

Another option is to combined the fifth fluid with the oil-rich fourth and sixth fluids flowing through the axial outlets at the upper ends of the reverse flow separators 118,120. This can be achieved by connecting the second outlet chamber 134 at the upper end of the separator unit with the third outlet chamber 150 by means of a tube 154, and omitting the upper oil-rich outlet 112. The fourth and sixth fluids then flow from the upper outlet chamber 134 through the tube 154 into the lower oil-rich outlet chamber 150, and exit the unit through the second oil-rich outlet 152.

Figure 5:
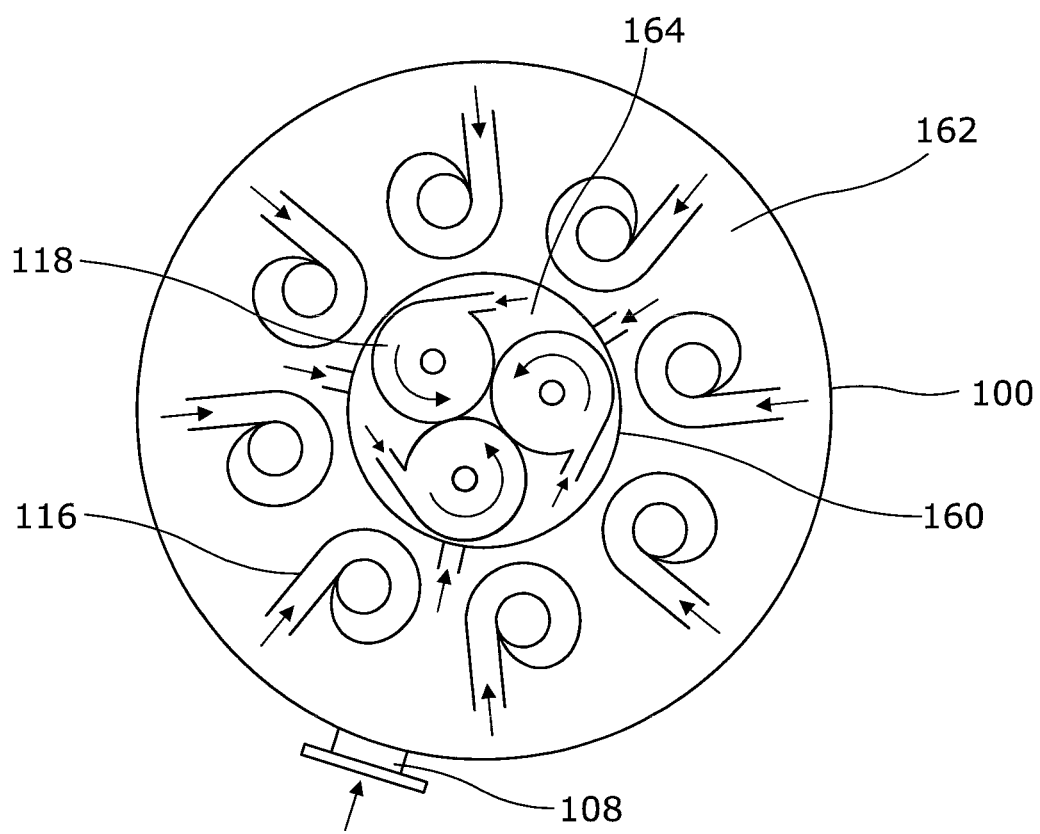
FIG. 5 is an end view of a third integrated separator unit.

FIG. 5 is a cross-sectional view through a third integrated separator unit that includes multiple uniaxial and reverse flow separators, allowing it to process increased quantities of fluids. In other respects, the separator unit is similar to the first integrated separator unit described above and shown in FIGS. 2 and 3.

The separator unit includes an outer cylindrical housing 100 and an inner cylindrical housing 160 that is substantially coaxial with the outer housing 100. The inner housing 160 divides the separator unit into an outer chamber 162 and an inner chamber 164. The outer chamber 162 contains a set of uniaxial cyclonic separators 116 (in this case eight uniaxial separators) and the inner chamber 164 contains three first reverse flow cyclonic separators 118 and three second reverse flow cyclonic separators 120 (the second reverse flow separators being omitted from the drawing in the interest of clarity). The integrated separator unit also includes an inlet 108 for a mixture of water and oil and transfer ports 166 for allowing the first and second fluids to flow from the uniaxial cyclonic separators 116 into the respective inlets of the first and second reverse flow separators 118,120. The outlets of the reverse flow separators and the integrated unit are omitted from the drawings in the interest of clarity.

In use, a mixture of oil and water flows through the inlet 108 into the inlet chambers of the uniaxial cyclonic separators 116 and is divided into first and second fluids. These first and second fluids are then delivered to the respective inlets of the first and second reverse flow separators 118,120. Once the second stage of separation has been completed by the reverse flow separators, the separated fluids are delivered from the integrated separator unit through respective outlets. These outlet fluids may be recombined and/or further processed if required, as previously described.

Figure 6:
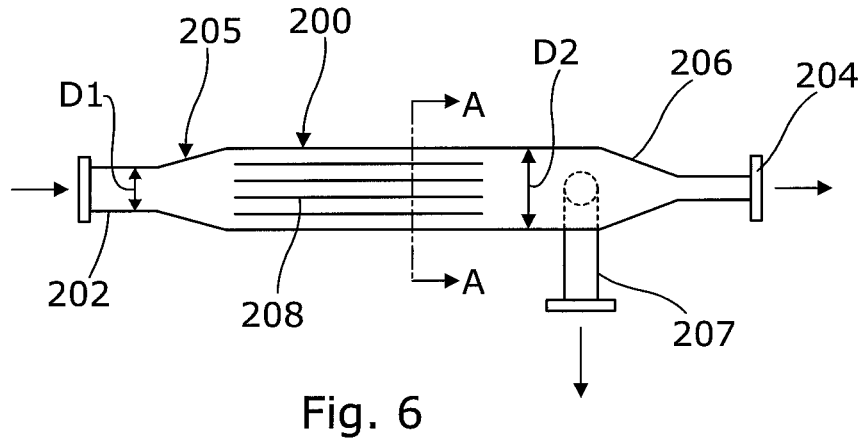
FIG. 6 is a top view.
Figure 7:
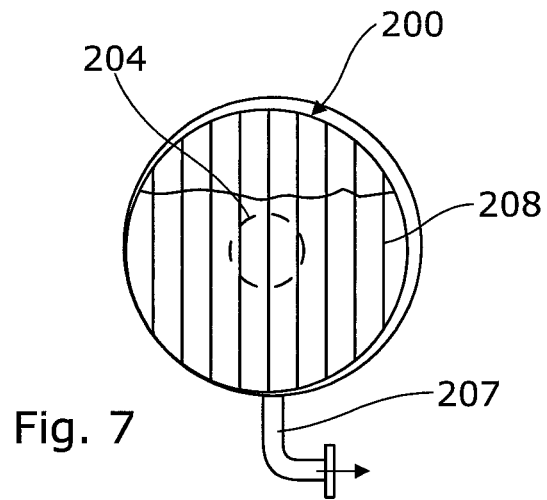
FIG. 7 is an end view.
Figure 8:
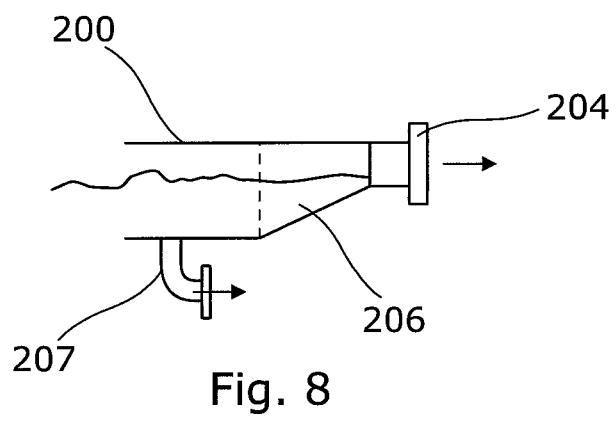
FIG. 8 is a partial side view of a flow conditioning unit.

Optionally, the produced fluids from an oil field may be processed by a fluid conditioning system prior to being delivered to an oil/water separation system as described above. The fluid conditioning system helps to reduce turbulence in the fluid mixture and allows droplets of oil and water to coalesce and separate, which enables the downstream separation system to operate more efficiently. A suitable conditioning system is shown in FIGS. 6 to 8.

The flow conditioning system includes a horizontal cylindrical separation chamber 200 having an axial inlet 202 at one end and an axial outlet 204 at the opposite end. The chamber 200 has a diameter that is between two and four times the diameter of the inlet 202, and a length that is ten to fifteen times its diameter. The chamber 200 is connected at its upstream end to the axial inlet 202 by a concentric (or alternatively eccentric) conical transition section 205. The downstream end of chamber 200 is connected to the outlet 204 by a non-concentric conical transition section 206. A radial outlet 207 extends downwards from the lowest part of the pipe 200, just upstream of the outlet 204. The upstream part of the pipe 200 between the axial inlet 202 and the radial outlet 207 contains a set of vertically mounted plates 208, which extend across the height of the pipe 200 to reduce turbulence in the fluid as it flows through the pipe, whilst still allowing vertical separation under gravity of oil-rich and water-rich fluids contained within the oil/water mixture. These plates 208 extend from adjacent the inlet 202 along approximately three-quarters the length of the chamber 200.

In use, a mixture of oil and water is delivered to the inlet 202 and flows continuously through the conditioning system, exiting through the axial and radial outlets 204,206. As the oil/water mixture flows into the chamber 200 its velocity is reduced by a factor of between 4 and 16, owing to the increased cross-sectional area of the chamber. This allows a degree of separation between the denser, water-rich fluids, which flow along the lower part of the pipe, and the less dense oil-rich fluids, which flow along the upper part of the pipe 200.

A portion of the water-rich fluid is drawn off through the radial outlet 207 from the lower part of the pipe, the remainder of the fluids leaving through the axial outlet 204 in the end of the flow conditioning system. The water-rich fluids drawn through the radial outlet 207 are then delivered to the oil/water separation unit for further separation, as described above. In this way, the oil content of the oil/water mixture delivered to the separation system can be significantly reduced, thereby allowing the system to operation with a higher degree of efficiency. The oil-rich fluids exiting through the axial outlet 204 may be subsequently be combined with the oil-rich fluids separated by the separation system.

Figure 9:
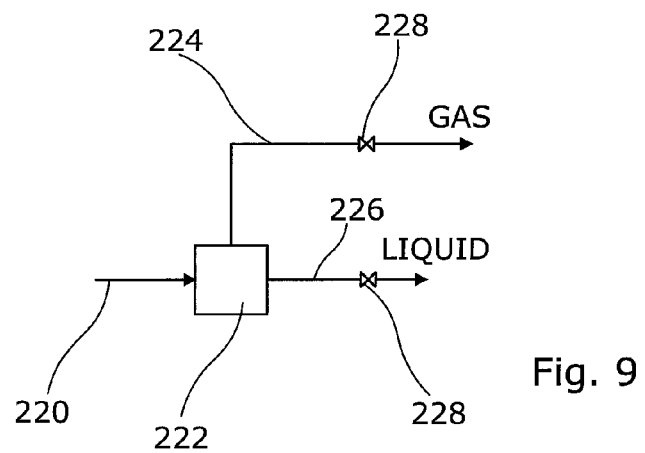
FIG. 9 is a schematic view of a gas/liquid separator unit.

The oil/water separation system may not work efficiently if the produced fluids from the oil well contain an excess gas quantity. In this case, the system may include a gas-liquid separation system, to remove the gas from the produced liquids, before they are delivered to the separation system. A suitable gas separation system is shown schematically in FIG. 9. This includes an inlet 220 for the produced fluids from the oil/gas well, a gas/liquid separator 222, a first outlet for gas 224 and second outlet for liquid 226. Valves 228 are provided in the outlet lines 224,226 for controlling the flow of fluids through those lines. The gas separator 222 is not shown in detail but any suitable separator unit may be used. For example, this may be a cyclonic separator, of either the uniaxial or reverse flow type. Preferably, the gas separation system reduces the gas content of the fluids delivered to the oil/water separation system to less than 3% by volume at the processing pressure and temperature.

The invention claimed is:

1. A separation system for the bulk separation of water from an oil/water mixture, the system comprising:
   a uniaxial cyclonic separator comprising a first inlet for receiving the oil/water mixture, a spiral-shaped inlet chamber, a separation chamber that separates the oil/water mixture by cyclonic action into a first fluid and a second fluid, the first fluid being denser and having a greater proportion of water than the second fluid, at least one spiral-shaped outlet chamber, a first outlet for the first fluid and a second outlet for the second fluid,
   a first reverse flow cyclonic separator having a second inlet that receives the first fluid from the first outlet, a separation chamber that separates the first fluid by cyclonic action into a third fluid and a fourth fluid, the third fluid being denser and having a greater proportion of water than the fourth fluid, wherein the third fluid comprises an oil/water mixture containing less than 1% oil, a third outlet for the third fluid and a fourth outlet for the fourth fluid,
   a second reverse flow cyclonic separator having a third inlet that receives the second fluid from the second outlet, a separation chamber that separates the second fluid by cyclonic action into a fifth fluid and a sixth fluid, the fifth fluid being denser than the sixth fluid, a fifth outlet for the fifth fluid and a sixth outlet for the sixth fluid,
   and a containment vessel that contains the uniaxial cyclonic separator and the first and second reverse flow cyclonic separators, the containment vessel comprising a first chamber connected to the third outlet to receive the third fluid, and a second chamber connected to the fourth and sixth outlets to receive the fourth and sixth fluids.

2. A separation system according to claim 1, wherein the fifth outlet is connected via flow control means to the third outlet and the sixth outlet to combine the fifth fluid selectably with either the third fluid or the sixth fluid.

3. A separation system according to claim 1, including a flow control device for controlling the flow through the third outlet, a sensor for sensing the composition of the third fluid and a control device for controlling operation of the flow control device according to the sensed composition of the third fluid.

4. A separation system according to claim 1, wherein the first chamber is connected to the fifth outlet to receive the fifth fluid.

5. A separation system according to claim 1, including a third chamber connected to the fifth outlet to receive the fifth fluid, wherein the third chamber is connected to the second chamber to receive the fourth and sixth fluids.

6. A separation system according to claim 1, wherein the containment vessel includes an outer chamber containing multiple uniaxial cyclonic separators and an inner chamber containing multiple reverse flow cyclonic separators.

7. A separation system according to claim 1, including a flow conditioning device upstream of the uniaxial cyclonic separator, comprising an inlet for a precursor fluid, a separation chamber for separating the precursor fluid by gravity into a denser fluid and a less dense fluid, an outlet for the denser fluid and an outlet for the less dense fluid, wherein the outlet for the denser fluid is connected to the first inlet of the uniaxial cyclonic separator, and wherein said denser fluid comprises said oil/water mixture.

8. A separation system according to claim 7, wherein the flow conditioning device includes a substantially horizontal separation chamber, wherein said inlet for a precursor fluid is at one end of the substantially horizontal separation chamber, said outlet for the less dense fluid is at an opposite end of the substantially horizontal separation chamber, and said outlet for the denser fluid is in a lower part of the substantially horizontal separation chamber.

9. A separation system according to claim 1, including a gas separator device upstream of the uniaxial cyclonic separator, which is constructed and arranged to remove gas at least partially from the oil-water mixture fed to the first inlet of the uniaxial cyclonic separator.

10. A separation system according to claim 1, wherein the separation chamber of said uniaxial cyclonic separator has a length in the range five to ten times its minimum diameter.

11. A separation system according to claim 1, wherein the first reverse flow cyclonic separator is substantially conical in shape, having a length in the range ten to twenty times its maximum diameter.

12. A separation system according to claim 1, wherein the first inlet is connected to a source to receive the oil/water mixture.

13. A method for the bulk separation of water from an oil/water mixture, the method comprising:
 delivering the oil/water mixture to a uniaxial cyclonic separator having a spiral-shaped inlet chamber, a separation chamber and at least one spiral-shaped outlet chamber, and separating the oil/water mixture by cyclonic action into a first fluid and a second fluid, the first fluid being denser and having a greater proportion of water than the second fluid,
 delivering the first fluid to a first reverse flow cyclonic separator, and separating the first fluid by cyclonic action into a third fluid and a fourth fluid, the third fluid being denser and having a greater proportion of water than the fourth fluid, wherein the third fluid comprises an oil/water mixture containing less than 1% oil,
 delivering the second fluid to a second reverse flow cyclonic separator and separating the second fluid by cyclonic action into a fifth fluid and a sixth fluid, the fifth fluid being denser than the sixth fluid, and
 delivering the third fluid to a first chamber of a containment vessel that contains the uniaxial cyclonic separator and the first and second reverse flow cyclonic separators, and delivering the fourth and sixth fluids to a second chamber of the containment vessel.

14. A method according to claim 13, further comprising combining the fifth fluid selectively with either the third fluid or the sixth fluid.

15. A method according to claim 13, further comprising sensing the composition of the third fluid and controlling the flow of the third fluid according to the sensed composition of the third fluid.

16. A method according to claim 13, further comprising separating a precursor fluid by gravity into a denser fluid and a less dense fluid, and delivering the denser fluid to the uniaxial cyclonic separator, wherein said denser fluid comprises said oil/water mixture.

17. A method according to claim 13, further comprising removing gas at least partially from the oil/water mixture fed to the uniaxial cyclonic separator.

18. A method according to claim 13, wherein the oil/water mixture received at the inlet of the uniaxial cyclonic separator comprises at least 1% oil, or at least 5% oil, or at least 10% oil, up to approximately 45% oil, by volume.

19. A method according to claim 13, wherein the third fluid comprises less than 0.5% oil, more preferably less than 0.1% oil, by volume.

20. A method according to claim 13, wherein the third fluid comprises by volume 40-70% of the fluid mixture received at the first inlet.

* * * * *